United States Patent [19]

Hulyer

[11] Patent Number: 4,574,300

[45] Date of Patent: Mar. 4, 1986

[54] HIGH-DEFINITION COLOR TELEVISION TRANSMISSION SYSTEM

[75] Inventor: Michael G. Hulyer, Crawley Down, England

[73] Assignee: U.S. Philips Corporation, New York, N.Y.

[21] Appl. No.: 556,260

[22] Filed: Nov. 28, 1983

[30] Foreign Application Priority Data

Dec. 22, 1982 [GB] United Kingdom ............... 8236368

[51] Int. Cl.$^4$ ............................................. H04N 11/20
[52] U.S. Cl. ..................................... 358/11; 358/12; 358/140
[58] Field of Search ............................ 358/11, 12, 141

[56] References Cited

U.S. PATENT DOCUMENTS

| | | | |
|---|---|---|---|
| 3,830,971 | 8/1974 | van de Polder | 178/6.8 |
| 4,476,484 | 10/1984 | Haskell | 358/11 |
| 4,480,267 | 10/1984 | van den Avoort | 358/140 |
| 4,485,401 | 11/1984 | Tan | 358/141 |

FOREIGN PATENT DOCUMENTS 2000413B 1/1979 United Kingdom .

OTHER PUBLICATIONS

CBS Bares Scheme for 1050-Line TV Electronics, Oct. 6, 1983, pp. 53-54.
Data Compression for High Definition TV: An NTSC Compatible Approach, Apple and Tsou, Proceedings of 1982 National Telecommunications Conference, 7 Nov. 1982.
High Definition Television (HDTV)-Compatibility and Distribution, Haskell, IEEE Trans. on Communication, vol. COM-31, No. 12, Dec. 1983, pp. 1308-1317.
High-Definition Television System-Signal Standard and Transmission-Fujio, et al., Aug. 1979, NHK Laboratories Notes, Series No. 239, pp. 1-17.
The BBC Moves Toward Better Quality Pictures, Engineering Press Release, BBC, 2-1982, pp. 1-2.
van Buul, Standards Conversion of a Video Phone Signal with 313 Lines into a TV Signal with 625 Lines, Philips Research Reports, vol. 29, #5, pp. 413-428, Oct. 1974.

Primary Examiner—Michael A. Masinick
Attorney, Agent, or Firm—Thomas A. Briody; William J. Streeter; Edward W. Goodman

[57] ABSTRACT

A high definition television transmission system in which a wide band interlaced television signal (FIG. 2) having 1249 lines per field is divided to provide first and second interlaced television signals each having 625 lines per field and consequently reduced bandwidth. Adjacent lines of the first television signal have their low frequency information (0-3 MHz) (FIG. 2) derived from alternate lines in the wide band signal while the corresponding information for adjacent lines in the second television signal (FIG. 4) is derived from the intervening lines in the wide band signal. The high frequency information (3-5.5 or 6 MHz) for the lines of both the first and second television signals (FIG. 7) is derived from the average of the corresponding information in adjacent lines of the wide band signal. The first television signal also contains a color subcarrier which is modulated by the average of the color information in adjacent lines of the wide band signal (FIG. 7). The two television signals may be jointly received for the provision of a high definition display but the invention has the distinct advantage that the first television signal may be received alone by currently manufactured television receivers for reproduction of a display of a quality which is currently acceptable.

12 Claims, 12 Drawing Figures

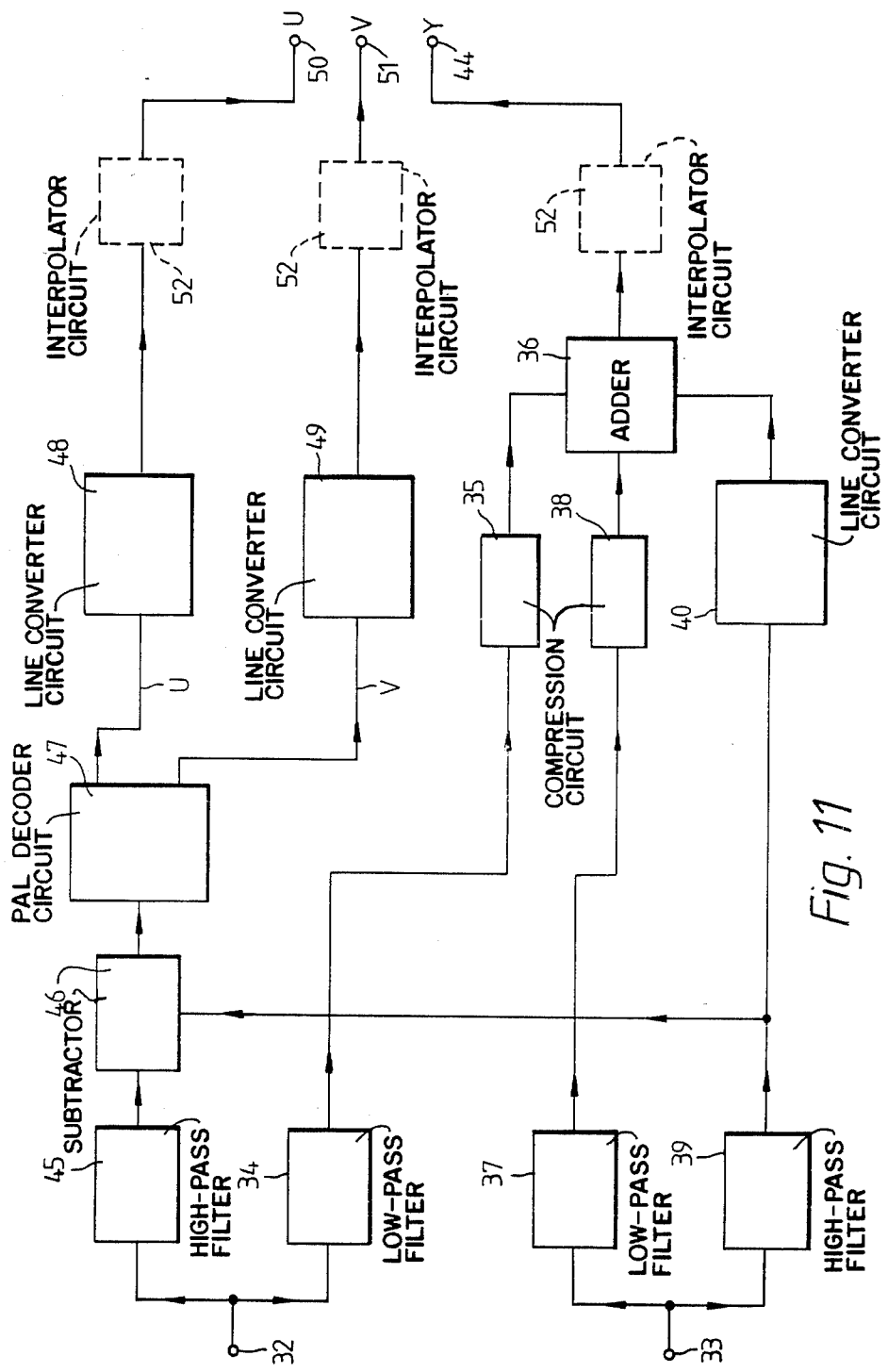

HIGH-DEFINITION COLOR TELEVISION TRANSMISSION SYSTEM

BACKGROUND OF THE INVENTION

The present invention relates to a high definition color television transmission system in which a wide band television signal, having adjacent low and high frequency components and n lines per picture, is converted into a narrower band television signal having m lines per picture, where m is substantially ½n, with both signals having the same field and picture rates, said converted television signal having adjacent low and high frequency luminance portions, the low frequency luminance portion in respective adjacent lines of a field of said converted television signal being derived from the low frequency components in respective alternate lines in a field of said wide band signal. The invention also relates to transmission and reception equipment for use with such a system.

U.S. Pat. No. 3,830,971 describes a line standard converter in which a television signal having a first number of lines is converted into a second television signal with substantially half the number of lines. The system described therein only takes information from alternate lines of the first signal and thus, if the second signal was restored to a signal having the same number of lines as the first signal, then only half the information for this signal would be present such that this signal would be of poor definition when compared with the first signal from whence it originated.

The color television signal currently transmitted by the broadcast authorities in the United Kingdon uses the PAL system with the transmissions taking place in the U.H.F. bands IV and V. In such transmissions, the luminance information has a bandwidth of 5.5 MHz with a color subcarrier located at a point nominally 4.43 MHz above the carrier frequency, the color subcarrier being modulated by the color information. Substantially all of the currently manufactured color television receivers do not fully utilize all the luminance information transmitted. The luminance information above 3.5 MHz in a receiver is reduced in magnitude to simplify the operation of decoding the color information and, without such simplified decoding, interference between the luminance and color information signals would be observed on the display. Considerable interest has however been shown in increasing the quality of the display and this can be done by using the whole of the luminance information transmitted.

Various suggestions have been made to further increase the bandwidth and hence the quality and definition of transmitted color television signals. One such suggestion contemplates the transmission of a single sideband luminance modulated signal of 10 MHz bandwidth with the modulated color subcarrier being located in the other sideband. Such a transmission could not readily be currently transmitted in the U.H.F. bands IV or V as the required bandwidth would overlap into an adjacent channel. In addition, such a transmission could not be received by television receivers currently manufactured and would thus only be receivable by specially constructed receivers. A further suggestion proposed by NHK (Japan Broadcasting Corporation) in their NHK Laboratories Note, Ser. No. 239, August 1979 contemplates the separate transmission of luminance and colour information in separate channels and suffers from similar objections to those above. Yet a further suggestion comes from the BBC (British Broadcasting Corporation) in their Engineering Press Release "The BBC moves towards better quality pictures", dated Feb, 23, 1982 where, for wide band transmission such as those via a satellite or optical fiber cable, it is suggested that the high frequency luminance information above 3.5 MHz be filtered off and this higher frequency information shifted upwards to a higher band (8 MHz upwards) and transmitted together with the original low frequency information and chrominance signals. Such a system cannot be used with current channel spacing in the UHF bands IV and V and although the low frequency luminance information and chrominance signals could be used to provide a reasonable display in most currently manufactured color television receivers, any receiver designed to utilize the full 5.5 MHz luminance bandwidth would produce a display that is impaired by the signal of this suggestion.

SUMMARY OF THE INVENTION

It is an object of the present invention to provide a high definition color television transmission system which, besides being capable of being received by high quality reception equipment, can also be received by currently manufactured color television receivers while the system can be transmitted over transmission paths of narrower bandwidth than that of the wide band signal.

The invention provides a high definition color television transmission system in which a wide band television signal, having adjacent low and high frequency components and n lines per picture, is converted into a narrower band television signal having m lines per picture, where m is substantially ½n, with both signals having the same field and picture rates, said converted television signal having adjacent low and high frequency luminance portions, the low frequency luminance portion in respective adjacent lines of a field of said converted television signal being derived from the low frequency components in respective alternate lines in a field of said wide band signal, characterized in that said wide band signal is also converted into a second narrower band television signal having the same number of lines and the field and picture rates as the first mentioned converted signal and also having adjacent low and high frequency luminance portions, the low frequency luminance portion in respective adjacent lines of a corresponding field of said second converted signal being derived from the low frequency components in respective intervening lines of the field of said wide band signal, the high frequency luminance portion in respective adjacent lines of a field of said first and second converted signals being derived from the average of the high frequency components in adjacent lines of a field of said wide band signal while respective adjacent lines of a field of said first converted signal additionally contain a color subcarrier modulated by the average of the color information in adjacent lines of a field of said wide band signal, said modulated color subcarrier being located within the bandwidth of the high frequency luminance portion of said first converted signal, said first and second converted signals being transmitted by way of respective first and second transmission paths, the system being such that the transmissions from said first and second transmission paths may be received together and a wide band television signal having n lines per picture, reconstituted from said first and second converted signals for reproduction as a high definition color television display or the transmission from the first transmission path may be received alone for reproduction as a color television display of normal quality as herein defined.

By the expression "a color television display of normal quality" we mean one which is at least comparable with the quality as produced by the average domestic color television receiver as presently available of a corresponding display screen size when viewed at a typical viewing distance appropriate to the screen size.

The transmission by way of the first transmission path may contain periodic bursts at the frequency of the color subcarrier while the transmission by way of the second transmission path also contains periodic bursts at the frequency of the color subcarrier which bursts have the same phase as those in the first transmission path.

The first and second transmission paths may comprise respective first and second radio frequency television channels having different carrier frequencies or alternatively may comprise the respective lower and upper or upper and lower sidebands of a radio frequency transmission.

These first and second transmission paths can also be the record/reproduce channels of video recorder apparatus and where these are channels of separate video tape recorders, the recorders being controlled to ensure synchronization therebetween by means of the periodic bursts at the frequency of said color subcarrier in the transmissions of said first and second transmission paths.

The invention also provides television transmission equipment for use with the above high definition color television transmission system comprising means for providing a wideband color television signal having adjacent low and high frequency components and n lines per picture, means for producing the low frequency portion of a narrower band first luminance signal of m lines per picture, where m is substantially $\frac{1}{2}n$, and having the same field and picture rates as said wideband signal from said wideband signal, said first luminance signal having adjacent low and high frequency portions the low frequency luminance portion having respective adjacent lines of a field derived from the low frequency components in respective alternate lines of a field of said wideband signal, characterized in that said equipment additionally comprises means for producing the low frequency portion of a second narrower band luminance signal having the same number of lines and same field and picture rates as said first luminance signal from said wideband signal, the second luminance signal also having adjacent low and high frequency portions the low frequency luminance portion having respective adjacent lines of a field derived from the low frequency component in respective intervening lines of a field of said wideband signal, means for producing the high frequency portion for said first and second luminance signals from said wideband signal such that respective adjacent lines of the high frequency luminance portion are derived from the average of the high frequency components in adjacent lines of a field of said wideband signal, means for producing narrower band color information signals having the same number of lines and the same field and picture rates as said luminance signals from said wideband signal such that respective adjacent lines of a field of said color information signals are derived from the average of the color information present in adjacent lines in the same field of said wideband signal, means for encoding said color information signals onto a color subcarrier, first summing means for receiving the low frequency portion of said first luminance signal, the high frequency portion for said first luminance signal and the encoded colour subcarrier and for producing therefrom said first converted signal, and second summing means for receiving the low frequency portion of said second luminance signal and the said high frequency luminance portion and for producing therefrom said second converted signal.

Where the wideband television signal may be in the form of a luminance signal and first and second color difference signals, a raster converter arrangement may receive the wideband television signal and produce therefrom expanded luminance and color difference signals where each expanded signal occupies substantially twice the period per line of that of the wideband signal and derived from alternate lines in a field of said wideband signal, the raster converter arrangement also producing second expanded luminance and color difference signals also having a line period substantially twice that of the wideband signal and which are derived from intervening lines in a field of the wideband signal.

The expanded color difference signals for the alternate lines of the wideband signal and the expanded color difference signals for the intervening lines of the wideband signal may be applied to a chroma averaging arrangement for producing therefrom an averaged expanded color difference signal, each line of which corresponds to the average of the color information in adjacent lines in a field of the wideband signal prior to their application to the encoding means.

The first and second expanded luminance signals may be applied to a luminance signal averaging arrangement for averaging the expanded luminance signals, the output of the luminance averaging arrangement being applied to a high-pass filter whose output produces the high frequency luminance portion for the first and second luminance signals.

The invention additionally provides television reception equipment for use with the above high definition television transmission system comprising a first input for receiving said first converted signal having m lines per picture, means for deriving the low frequency luminance portion from said first converted signal and means for subjecting said low frequency luminance portion to signal compression for producing a first low frequency luminance signal of n lines per picture and substantially twice the bandwidth of the low frequency portion of said first converted signal, said first low frequency luminance signal containing luminance information in its alternate lines, characterized in that said equipment comprises a second input for receiving said second converted signal also having m lines per picture, means for deriving the low frequency luminance portion from said second converted signal and means for subjecting this low frequency luminance portion to signal compression for producing a second low frequency luminance signal of the same number of lines per picture and the same field and picture rates as said first low frequency luminance signal, said second low frequency luminance signal containing luminance information in alternate of its lines, means for deriving the high frequency luminance portion from said first and/or said second converted signal and means for subjecting the high frequency luminance portion to signal compression for producing a high frequency luminance signal of the same number of lines per picture and the same field and picture rates as said low frequency luminance signals, said high frequency luminance signal containing luminance information in each of its lines, means for combining said first and second low frequency luminance signals and said high frequency luminance signal in such manner as to produce a wideband luminance signal of n lines per picture containing low and high frequency information in each line, means for deriving the encoded color subcarrier from said first converted signal, means for subjecting the encoded color subcarrier to signal decoding and compression for producing respective color information signals of the same number of lines per picture and the same field and picture rates as said luminance signals, said color information signals containing color information in each of their lines.

The high frequency luminance signals may be derived from the second converted signal, the high frequency luminance portion from the second converted signal being subtracted from the high frequency portion of the first converted signal to produce the encoded color subcarrier.

DESCRIPTION OF THE DRAWINGS

The above and other features of the invention will now be described by way of example with reference to the accompanying drawings, in which:

FIG. 11 is a block diagram of television reception equipment according to the invention.

DESCRIPTION OF PREFERRED EMBODIMENT

Figure 1:
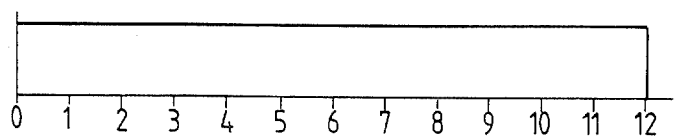
FIG. 1 is a graph of a wide band television signal.
Figure 2:
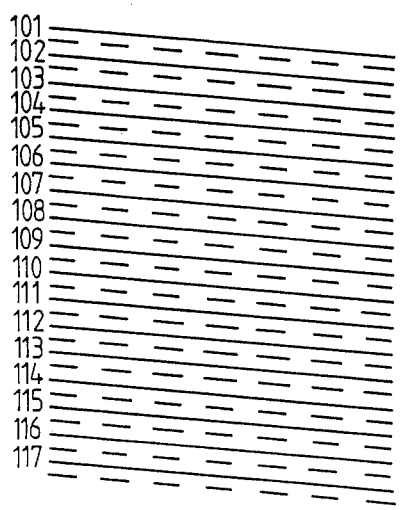
FIG. 2 shows the spatial relationship of lines of the signal of FIG. 1.
Figure 3:
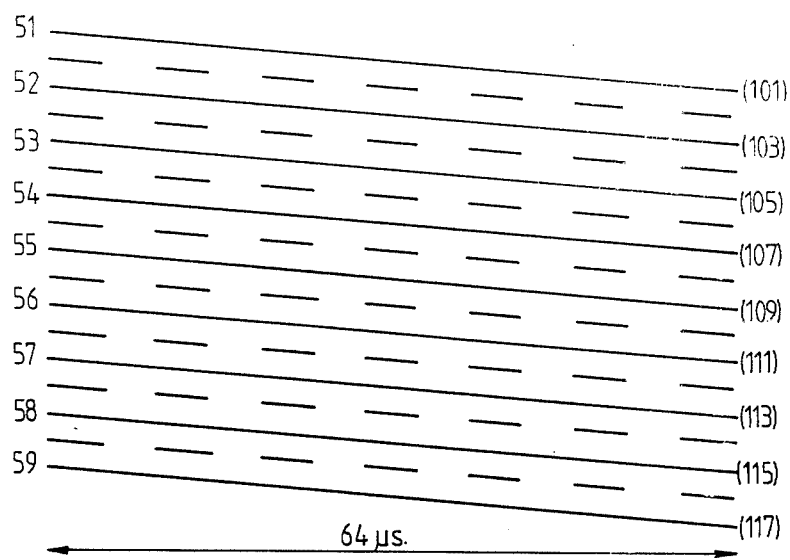
FIGS. 3, 4 and 7 show the spatial relationship of lines of signals present in the system according to the invention.
Figure 4:
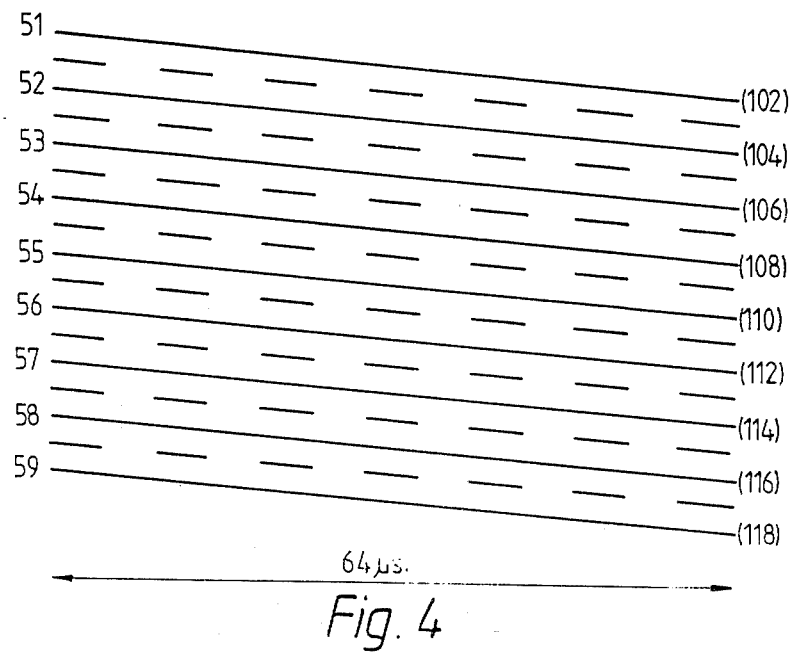

In FIG. 1 there is shown in idealized form the frequency characteristic of a wide band television signal for a high definition television system having 1249 lines per picture with two fields per picture and 25 pictures or frames per second. As will be seen from this Figure, the bandwidth of the signal may be typically 12 MHz which is a little more than twice the bandwidth of currently broadcast color television signals in the United Kingdom and most other countries. The signal of FIG. 1 may represent the bandwidth of the luminance signal Y in a luminance/color difference system or, if derived directly from a television camera, the bandwidth of each of the red R, green G and blue B color signals. Such a number of lines per picture coupled with the increased bandwidth would be sufficient to give a marked improvement in the quality of the display obtained therefrom and which is sufficiently improved for it to be termed high definition when compared with the quality of display obtained with currently manufactured color television receivers. The choice of 12 MHz for the bandwidth of the 1249 line television signal is by way of example only, but such a bandwidth would have advantages as will become apparent hereinafter. For ease of description, FIG. 1 is considered to have the information contained therein divided into two parts, one part being that for the low frequency components below 6 MHz and the other part being for the high frequency components between 6 and 12 MHz. FIG. 2 shows a part of a raster of the lines of the 1249-line television signal in which each picture is formed from two interlaced fields each of 624½ lines, the first of such fields being represented in FIG. 2 by the numbered full lines while the lines of the second field are shown by the unnumbered broken lines. Each television line occupies a period of 32.03 μs, although the period per line during which picture information might be present could be of the order of 26 μs, the remaining parts of each line period being taken up by synchronizing and blanking signals. From the 1249-line television signal, of whatever form, are produced two 625-line interlaced television signals where the picture and field rates are the same as those for the 1249-line television signal. A first of these 625-line signals has a part of a raster of its lines for its low frequency luminance portion as shown in FIG. 3 where again the lines of the first field are indicated at the left-hand side by numbered full lines and the lines of the second field of the picture are again indicated by unnumbered broken lines. In FIG. 3, the lines of the television signal are expanded such that each line occupies a period of 64 μs, although the period per line during which luminance information is conveyed is only 52 μs. Each line of a field of the 625-line signal is derived from alternate lines of an associated field of the 1249-line signal shown in FIG. 2 and thus lines 51, 52, 53, 54, etc., of the first field of the first 625-line signal are, respectively, derived from lines 101, 103, 105, 107, etc., of the first field of the 1249-line signal, the line numbers of the 1249-line signal from which they are derived being shown in brackets on the right-hand side of the FIG. 3. The second 625-line signal shown in FIG. 4 has its low frequency luminance portion formed in a similar manner to that for the first 625-line signal with the exception that the lines of a field of the second 625-line signal are derived from the intervening lines of the associated field of the 1249 line signal. This is shown in FIG. 4 by the line number of the second 625-line signal present on the left-hand side of the FIG. 4 and with the line numbers from which they are derived in the 1249-line signal being shown in brackets on the right-hand side of the Figure. From FIG. 4 it will be seen that lines 51, 52, 53, 54, etc., of the first field of the second 625-line signal are, respectively, derived from the lines 102, 104, 106, 108, etc., of the first field of the 1249-line signal.

The first and second 625-line signals are derived substantially simultaneously and, due to the expansion of the line period, the low frequency luminance portions of these signals each occupy a bandwidth which is substantially half that of the low frequency components of the 1249-line signal. The frequency characteristics of the first and second 625-line signals are, respectively, shown in FIGS. 5 and 6 with the low frequency luminance portions occupying from 0 to 3 MHz of these signals.

Figure 5:
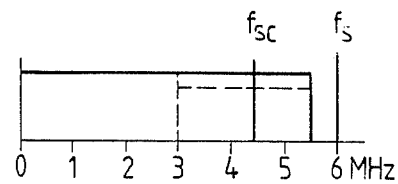
FIGS. 5 and 6 show graphs of signals present in the system according to the invention.
Figure 6:
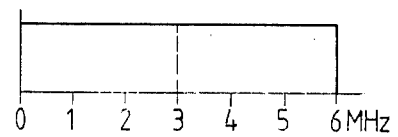

As will be seen from FIGS. 5 and 6, the first and second 625-line signals contain other signal components. Both 625-line signals contain a high frequency luminance portion extending upwards from 3 MHz that for the first 625-line signal being limited to 5.5 MHz, while that for the second 625-line signal extending to 6 MHz. These high frequency luminance portions are derived from the high frequency components of the 1249-line signal and, save for the slightly narrower bandwidth of the high frequency luminance portion of the first 625-line signal, these portions both contain the same luminance information. For adjacent lines in a field of these 625-line signals, these high frequency luminance portions are derived from the average of the high frequency components in adjacent lines of a field of the 1249-line signal.

As will be seen from FIG. 5, the first 625-line signal also contains a color subcarrier $f_{sc}$ at a nominal frequency of 4.4 MHz which is modulated in the appropriate PAL manner by color information signals in the form of color difference signals, the modulation extending nominally 1 MHz above and 1.5 MHz below the frequency of the subcarrier. These color information signals are derived in a similar way to that of the high frequency luminance portion in that for adjacent lines of a field of the second 625-line signal these signals are derived from the average of the appropriate color information in adjacent lines of a field of the 1249-line signal. For other television systems, the subcarrier frequency and the mode of modulation may differ. A sound signal or signals $f_s$ is/are present in the first 625-line signal at 6 MHz. It will be seen from FIG. 6 that the second 625-line signal does not contain a modulated subcarrier or sound signal. A synchronizing burst however may be present in the second 625-line signal corresponding to the color synchronizing burst in the first 625-line signal for synchronizing purposes to be described hereinafter.

Figure 7:
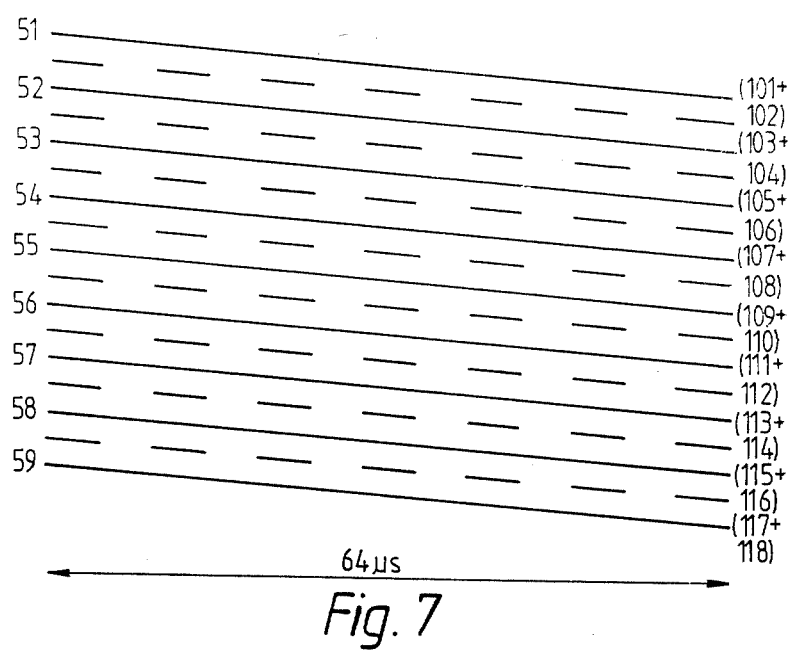

The derivation of the 625-line high frequency luminance portion and color information is shown in the part of the raster in FIG. 7 where again the line numbers of a field of the 625-line signal appear on the left-hand side and the line numbers from which these are derived in the 1249-line signal are present in brackets on the right-hand side, and from where it will be seen that lines 51, 52, 53, 54 etc., of this information are derived, respectively, from lines 101+102, 103+104, 105+106, 107+108, etc.

From an examination of FIG. 5, it will be realized that the first 625-line signal is substantially of the same form as that transmitted in the United Kingdom for color television transmissions, and thus such a signal may be reproduced by conventional television receivers of current design, for which reason the high definition television transmission system is compatible with current transmissions. The second 625-line signal does not have to be compatible and thus a larger bandwidth for the luminance information can be transmitted subject, where necessary, to the restrictions placed on the spacings of such transmissions. As the second 625-line signal does not have to be compatible with the first 625-line signal it can have an improved spatial response and can use more than the usual amount of each line period for the video information as it does not need to have conventional blanking and synchronizing pulses. In such a case, the reference burst at subcarrier frequency of the order of 1 μs may be used for synchronizing purposes leaving approximately 61 μs for the video information compared with the normal 52 μs.

The two signals may be transmitted on existing channels of the UHF bands IV or V, in those bands allocated for satellite television transmissions or could be transmitted as respective upper and lower sidebands of an r.f. transmission. Alternatively, the transmission paths for the two signals could be the same or separate video tape recorders.

The second 625-line signal need not be transmitted in conventional line-by-line format but could be transmitted in any form of data stream such as field-by-field without the need for synchronizing signals other than, for example, a field reference. Intermediate timing pulses might also be transmitted to ensure accurate re-timing. The method of transmitting such data could be in any conventional way but it would have to be reformed at the receiving end of the system into line-by-line television signals.

Figure 8:
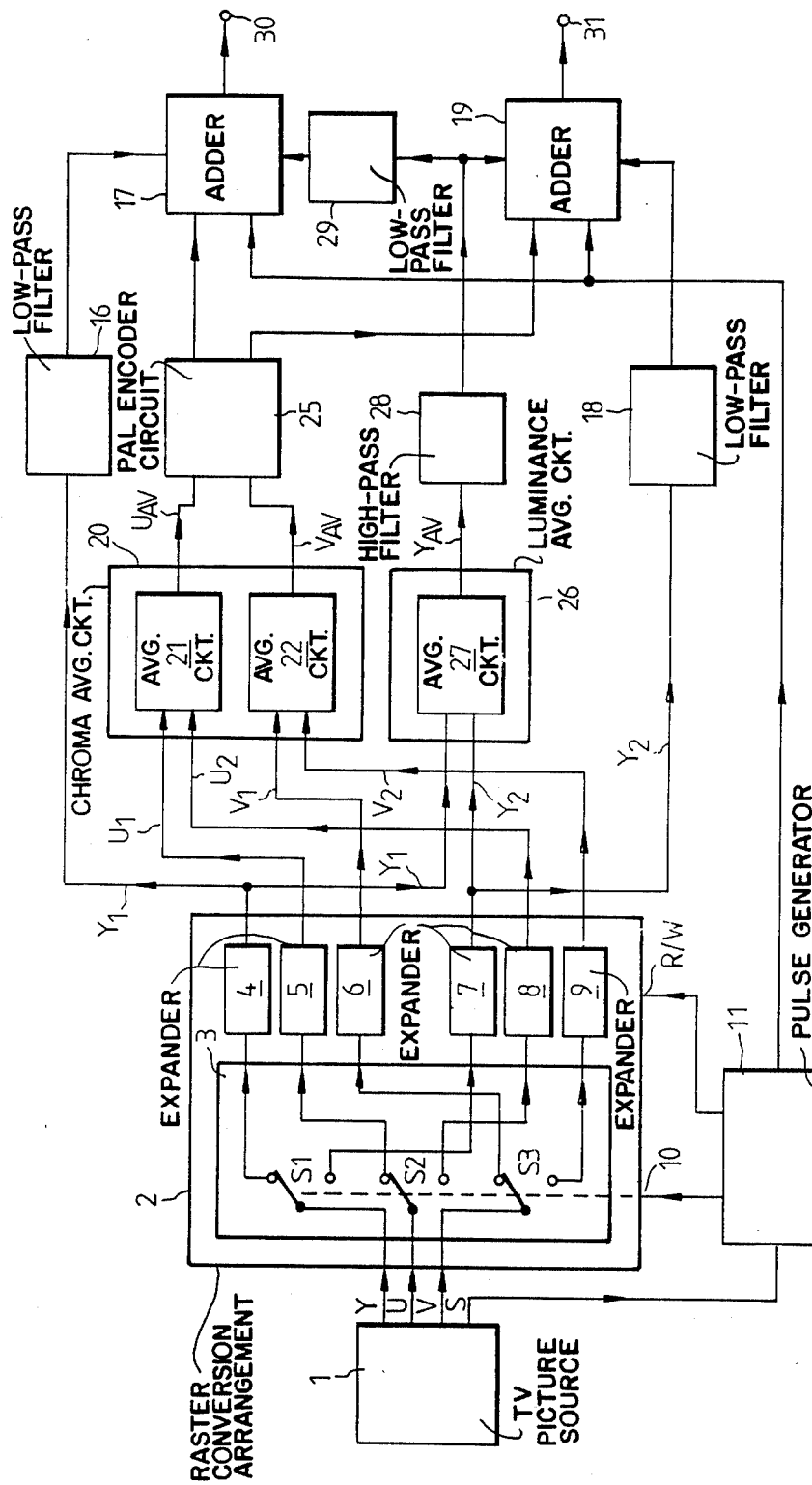
FIG. 8 is a block diagram of television transmission equipment according to the invention.
Figure 10:
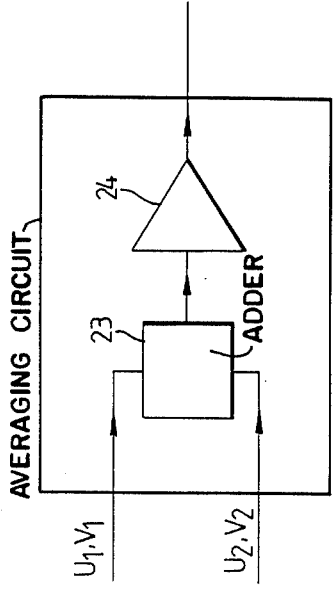
FIGS. 9 and 10 are block diagrams of parts of the equipment of FIG. 8.
Figure 9:
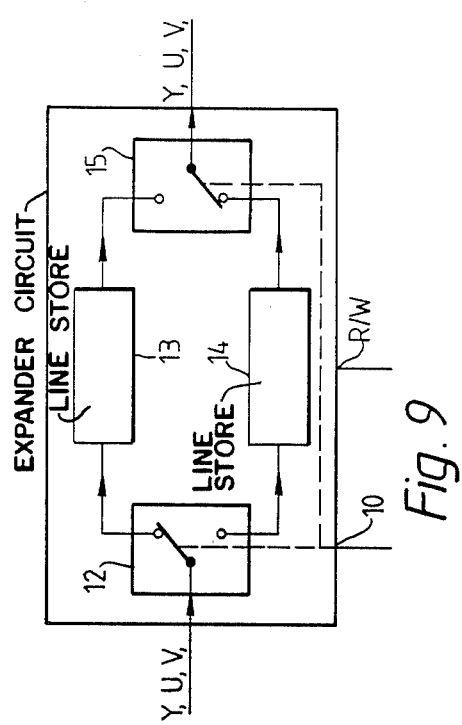

FIG. 8 shows a block diagram of television transmission equipment which can be used for transmitting the high definition color television transmission system described above. A television picture source 1 provides luminance signals Y, color difference signals U and V and synchronizing signals S for a television picture having 1249 lines, at a picture rate of 25 frames per second with two fields per frame and with a luminance bandwidth of 12 MHz. The line period for such television signals would as previously described be of the order of 32 μs. The terms U and V are used to differentiate between the color difference signals B-Y and R-Y, respectively. The luminance and color difference signals are applied to a raster conversion arrangement 2 which comprises a switching arrangement 3 and a number of expander circuits 4, 5, 6, 7, 8 and 9. The switching arrangement 3 comprises three change-over switches S1, S2 and S3, the moving contact of S1 receiving the luminance signal Y, while those of switches S2 and S3, repectively, receive the color difference signals U and V. The switches S1, S2 and S3 are controlled in synchronism from a control input 10 by pulses derived from a pulse generator 11 which is itself synchronized by the synchronizing signal S from the picture source 1. The switching arrangement 3 is arranged such that each change-over switch occupies the position shown during alternate line periods of a field of the 1249-line signal while the switches occupy their other position during the intervening line periods of that field. Thus in a first field, these switches might be in the position shown for odd-numbered lines and in their other position for even-numbered lines. The outputs from the change-over switches are connected as shown to be inputs of associated expanded circuits 4, 5, 6, 7, 8 and 9 whose outputs form the outputs of the raster converter arrangement 2. Each expander circuit is of the same construction which is shown in greater detail in FIG. 9 but operates in the manner described in *Philips Research Reports* 29, 1974, pages 413–428. The Y, U or V input in FIG. 9 is connected to the moving contact of a change-over switch 12 whose outputs are, respectively, connected to separate line stores 13 and 14, the outputs of the lines stores 13 and 14 being applied to respective stationary inputs of a further changeover switch 15 whose moving contact forms the output of the expander circuit. The operation of the expander circuits is such that switch 12 occupies the position shown for two line periods of the 1249-line signal from the picture source 1 during half of which time a television line of a field is written into the line store 13 under the control of a read/write input R/W. During the preceding two line periods of the 1249-line signal, the previous alternate line of the 1249-line signal was written into the picture store 14 and with switch 15 in the position shown that previous line is read out from picture store 14 under the control of input R/W at half the rate at which this line was read into that picture store. The expander circuits therefore produce video information which occupies approximately twice the period during which it was read-in, such information occupying only half the bandwidth (6 MHz) that it was read in. The outputs from the expander circuits forming the outputs of the raster conversion arrangement 2 are such that the luminance and color difference signals from the alternate lines of a field of the 1249-line signal are indicated by Y1, U1 and V1, while the luminance and color difference signals from the intervening lines of the same field are indicated by Y2, U2 and V2. The signals associated with the output Y1, U1 and V1 and with Y2, U2 and V2 each form a 625-line signal having the same picture rate of 25 frames per second with two interlaced fields per frame. The expanded luminance signal Y1 is applied to a low-pass filter 16 having a cut-off frequency of 3 MHz, the output of which is applied to a first input of a first adder circuit 17. In a similar manner, the expanded luminance signal Y2 is applied to a second low-pass filter 18 also having a cut-off frequency of 3 MHz, whose output is applied to a first input of a second adder circuit 19. The color difference signals U1, V1, U2 and V2 are applied to a chroma averaging circuit 20, where the U and V signals are separately averaged in first and second averaging circuits 21 and 22 of the same design, one of which is shown in greater detail in FIG. 10. In FIG. 10 the U1/V1 input and the U2/V2 input are applied to separate inputs of an adder circuit 23 in which these inputs are added together. The output of adder circuit 23 is applied to the input of an amplifier circuit 24 having an amplification factor of ½ and whose output forms the output of the averaging circuit which is the average of the two U or V signals at its inputs and hence the average of the U or V signal present in two adjacent lines of a field of the 1249-line signal. The color difference outputs of the chroma averaging circuit 20 are indicated as $U_{AV}$ and $V_{AV}$ and which are applied as inputs to a PAL encoder circuit 25 which also contains an oscillator for the color subcarrier at a nominal frequency of 4.4 MHz. The applied color difference signals are modulated in the normal PAL manner on the color subcarrier and the encoded output of the PAL encoder circuit 25, together with the color synchronizing burst are applied to the second input of the first adder circuit 17. A further output of the PAL encoder circuit 25 applies the (color) synchronizing burst to a second input of the second adder circuit 19 for possible synchronization during transmission.

The two 625 line luminance signals Y1 and Y2 are additionally applied to a luminance averaging circuit 26 containing an averaging circuit 27 which takes the same form as the averaging circuit shown in FIG. 10. From the two inputs, the luminance averaging circuit 26 provides at its output a luminance signal $Y_{AV}$ which, for a line in the 625-line signal is the average of the luminance signals in adjacent lines of a field of the 1249-line signal. This output is applied through a high-pass filter 28, having a characteristic complementary to that of the low-pass filters 16 and 18, to a third input of the second adder circuit 19, the output of filter 28 also being applied through a low-pass filter 29 having a cut-off frequency of 5.5 MHz to a third input of the first adder circuit 17. The low-pass filter 29 limits the luminance signal applied to the third input of the adder circuit 17 to the maximum frequency of the PAL system I as transmitted in the United Kingdom. (If the PAL system used was either B or G as transmitted in Continental Europe then low-pass filter 29 would have a cut-off frequency of 5 MHz.) Fourth inputs of the adder circuits 17 and 19 both receive the necessary vertical and horizontal synchronizing signals generated by the pulse generator 11.

The output of first adder circuit 17 appearing at terminal 30 is a 625 line television signal as described in relation to FIG. 5 containing a low frequency luminance portion (first adder input) from alternate lines of the 1249-line signal and a high frequency luminance portion (third adder input) which is the average of that appearing in adjacent lines of the 1249-line signal and a color difference modulated subcarrier (second adder input) which is also the average of that appearing in adjacent lines of the 1249-line signal. The output of the adder circuit 19 present at output terminal 31 is a 625-line television signal as described in relation to FIG. 6 having a low frequency luminance portion (first adder input) derived from the intervening line of the 1249 line signal and a high frequency luminance portion (third adder input) which is substantially the same as that appearing in the signal at the terminal 29. It will be appreciated that the television signal appearing at output terminal 30 is substantially identical to a normal PAL signal as transmitted in the United Kingdom and such a signal may be reproduced by a television receiver for current color television broadcasts.

The signals at the output terminals 30 and 31 are applied to separate transmission paths which may be separate video recorders or separate transmission channels in the UHF or even high frequency bands. Alternately, it is possible for the signals present at these output terminals to form the respective upper and lower sidebands of a broadcast transmission. Although the signal at output terminal 30 requires to be transmitted as a conventional broadcast television signal this is not necessary for the signal, at terminal 31 which may be transmitted in any convenient form which may not in itself be compatible with normal television signals.

Figure 12:
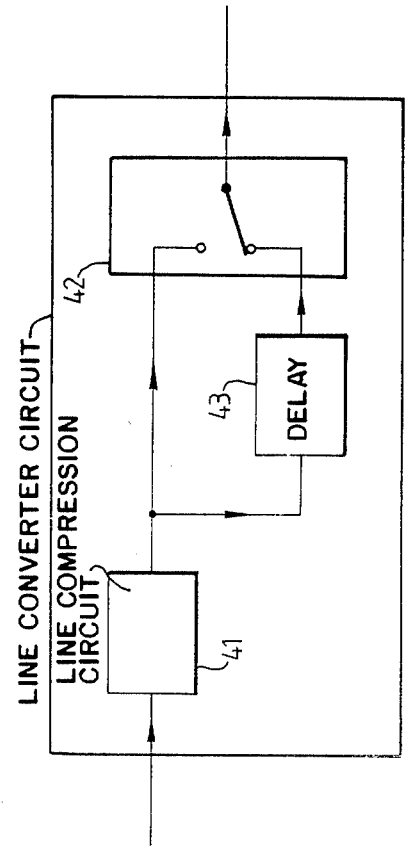
FIG. 12 is a block diagram of a line converter circuit for use in the receiving equipment of FIG. 11.

A television receiver suitable for use with the above transmission system is shown in the form of a block diagram in FIG. 11. In that Figure terminals 32 and 33, respectively, receive the 625-line luminance signal limited to 5.5 MHz together with its color modulated subcarrier and the other 625-line luminance signal limited to 6 MHz. The signal present on input terminal 32 is applied to a low-pass filter 34 having a cut-off frequency of 3 MHz, the frequency limited output of this filter being applied to a compression circuit 35 which converts the 625-line low frequency luminance portion into a corresponding 1249-line signal. The compression circuit 35 is of the same construction as the expander shown in FIG. 9 with the exception that the 625-line information is written-in at its normal rate but read-out takes place at the rate of a 1249-line signal with a corresponding doubling of the bandwidth. The operation of such a compression circuit is described in U.K. Patent No. GB 2 000 413B which corresponds to U.S. Pat. No. 4,480,267. The output of the compression circuit 35 is therefore a 1249-line signal, alternate lines of which contain the low frequency luminance information present in the signal at terminal 32 and therefore corresponds to the low frequency luminance information (0 to 6 MHz) present in alternate lines of the original 1249-line signal from which the transmission originated. The low frequency luminance information from line compressor 35 is applied to a first input of an adder circuit 36. The signal present at terminal 33 is applied to a second low-pass filter 37 having a frequency characteristic substantially the same as that of filter 34. The low frequency output from filter 37 is applied to a second compression circuit 38 which is of the same construction and operates in the same manner as compression circuit 35. The output of the line compression circuit 38 is similarly a double bandwidth 1249-line signal alternate lines of which contain the low frequency luminance information which appeared in the intervening lines of the original 1249-line signal from which the transmission originated. The output of the line compression circuit 38 is applied to a second input of the adder circuit 36, in such a manner that the lines of low frequency luminance information from this output appear in the intervening lines from the output of compression circuit 35 containing no luminance information. The input at terminal 33 is also applied to a high-pass filter 39 having a frequency characteristic complementary to that of the low pass filters 34 and 37. The output of filter 39 is therefore the high frequency luminance information between 3 and 6 MHz present at terminal 33 which is applied to a 625-to-1249 line converter circuit 40 shown in greater detail in FIG. 12. From this FIG. 12, it will be seen that the high frequency luminance information is applied to a line compression circuit 41, of the same design and operation as the compression circuits 35 and 38, to produce at its output a 1249-line signal, alternate lines of which contain the average high frequency luminance information with the corresponding increase in bandwidth. This output is applied directly to a first input of a multiplexer 42 and indirectly to a second input of that multiplexer through a delay line 43 having a delay of one line period at the 1249 line signal rate (approximately 32 µs). During those line periods when a signal is not present at the first input, a delayed signal is present at the second input of the multiplexer 42 and with this multiplexer 42 being switched at 1249-line rate these inputs appear sequentially at the multiplexer output which forms the output of the converter 40 to form a 1249-line signal containing high frequency luminance information in every line which is applied to a third input of the adder circuit 36. The two low frequency luminance signals and the interpolated high frequency luminance signals are added together in adder circuit 36, the output of which produces at an output terminal 44, a 1249-line luminance signal having a bandwidth of 12 MHz.

The signal present at input terminal 32 is additionally applied to a high-pass filter 45 having a characteristic substantially corresponding to that of filter 39 such that it passes the 625-line high frequency luminance signal between 3 and 5.5 MHz and the color subcarrier modulated by color information. these components are applied to a first input of a subtractor circuit 46, a second input of which receives the high frequency luminance output from filter 39 which is subtracted from the signals at its first input to produce at the subtractor output the modulated color subcarrier free from luminance signals. The modulated color subcarrier is applied to a PAL decoder circuit 47 which produce 625-line U and V color difference signals at respective outputs, the U output being applied to a 625-to-1249 line converter 48 while the V output is applied to a similar converter 49. Each of these two converters 48 and 49 is constructed in a similar manner and operates in the same way as that of the converter 40 such that converter 48 produces a 1249-line signal with a U color difference signal in every line, while the output of converter 49 comprises a 1249-line signal with a V color difference signal in every line, these outputs being respectively applied to terminals 50 and 51. The signals present on terminals 44, 50 and 51 can be applied to a color display such as one containing a high definition shadow mask tube or to a high definition television projector to produce a high definition display. If desired prior to appearing at these terminals, each signal may be subjected to interpolation in an interpolator circuit 52.

In the above descriptions relating to television transmission and reception equipment, it will be appreciated that the embodiments described are somewhat diagrammatic and for the sake of simplicity their operations are discussed in terms of analog signals. There is no reason why parts of the circuitry should not perform their operations on digital signals with the consequent conversion of analog signals to digital form and vice versa.

The above description of a television transmission system and associated transmission and reception equipment has been in relation to television signals where the luminance and chrominance components are frequency multiplexed. However, it will be appreciated that the invention is not so limited and the luminance and chrominance components may be time multiplexed as provided in U.S. Pat. No. 4,335,393 or in the MAC (Multiplexed Analogue Component) system as recently proposed by the Independent Broadcasting Authority.

I claim:

1. A method of transmitting a high definition color television signal including a wide band television signal having adjacent low and high frequency luminance components and color information and having n lines per picture, said method comprising:

A. converting said wide band television signal into a first narrower band television signal having adjacent low and high frequency luminance portions, m lines per picture, where m is substantially ½n, and field and picture rates which are the same as that for said wide band television signal, wherein said converting step comprises:
(1) deriving the low frequency luminance portion in respective adjacent lines in a field of said first narrower band television signal from said low frequency luminance components in alternate lines in a corresponding field of said wide band television signal;
(2) deriving the high frequency luminance portion in respective adjacent lines in said field of said first narrower band television signal from the average of said high frequency luminance components in respective adjacent lines in said field of said wide band television signal;
(3) deriving color information for respective adjacent lines in said field of said first narrower band television signal from the average of said color information in adjacent lines in said field of said wide band television signal; and
(4) modulating said color information onto a color subcarrier located within the bandwidth of said high frequency luminance portion of said narrower band television signal;

B. transmitting said first narrower band television signal by way of a first transmission path;

C. converting said wide band television signal into a second narrower band television signal having adjacent low and high frequency luminance portions and the same number of lines and field and picture rates as that of said first narrower band television signal, wherein said converting step comprises:
(1) deriving the low frequency luminance portion in respective adjacent lines in a field of said second narrower band television signal from said low frequency luminance components in respective intervening lines in said field of said wide band television signal; and (2) deriving the high frequency luminance portion in respective adjacent lines in said field of said second narrower band television signal from the average of said high frequency luminance components in respective adjacent lines in said field of said wide band television signal; and D. transmitting said second narrower band television signal by way of a second transmission path, whereby said first and second narrower band television signals may be received together and a wide band television signal having n lines per picture reconstituted therefrom for reproduction as a high definition television display or the first narrower band television may be received alone for reproduction as a color display of standard quality.

2. A method of transmitting a high definition color television signal as claimed in claim 1, in which said first narrower band television signal contains periodic bursts at the frequency of the color subcarrier, characterized in that said second narrower band television signal also contains periodic bursts at the frequency of the color subcarrier, which bursts have the same phase as those in said first narrower band television signal.

3. A method of transmitting a high definition color television signal as claimed in claim 1 or 2, characterized in that said first and second transmission paths comprise respective first and second radio frequency television channels having different carrier frequencies.

4. A method of transmitting a high definition color television signal as claimed in claim 1 or 2, characterized in that said first and second transmission paths comprise the respective lower and upper, or upper and lower, sidebands of a radio frequency transmission.

5. A method of transmitting a high definition color television signal as claimed in claim 1 or 2, characterized in that said first and second transmission paths are the record/reproduce channels of video recorder apparatus.

6. A method of transmitting a high definition color television signal as claimed in claim 2, in which said first and second transmission paths are the record/reproduce channels of separate video tape recorders, characterized in that said recorders are controlled to ensure synchronization therebetween by means of the periodic bursts at the frequency of said color subcarrier in said first and second narrower band television signals.

7. Television transmission equipment for transmitting a high definition color television signal comprising means for providing a wide band color television signal having adjacent low and high frequency luminance components, color information and n lines per picture, means for producing a first narrower band television signal of m lines per picture, where m is substantially ½n, and having the same field and picture rates as said wide band television signal, from said wide band television signal, said first narrower band television signal having adjacent low and high frequency luminance portions, the low frequency luminance portion having respective adjacent lines of a field derived from the low frequency luminance components in respective alternate lines of a field of said wide band television signal, characterized in that said equipment additionally comprises means for producing a second narrower band television signal having the same number of lines and same field and picture rates as said first narrower band television signal from said wide band television signal, the second narrower band television signal also having adjacent low and high frequency luminance portions, the low frequency luminance portion having respective adjacent lines of a field derived from the low frequency components in respective intervening lines of said field of said wide band television signal, means for producing the high frequency portion for said first and second narrower band television signals from said wide band television signal such that respective adjacent lines of the high frequency luminance portions are derived from the average of the high frequency luminance components in adjacent lines of said field of said wide band television signal, means for producing narrower band color information signals having the same number of lines and the same field and picture rates as said narrower band television signals from said wide band television signal such that respective adjacent lines of a field of said color information signals are derived from the average of the color information present in adjacent lines in the same field of said wide band television signal, means for encoding said color information signals onto a color subcarrier, first summing means for receiving the low frequency portion for said first narrower band television signal, the high frequency portion for said first narrower band television signal and the encoded color subcarrier and for producing therefrom said first narrower band television signal, and second summing means for receiving the low frequency luminance portion for said second narrower band television signal and said high frequency luminance portion and for producing therefrom said second narrower band television signal.

8. Television transmission equipment as claimed in claim 7, in which the wide band television signal is in the form of a luminance signal and first and second color difference signals, characterized in that said equipment further comprises a raster converter arrangement for receiving said wide band television signal and for producing therefrom first expanded luminance and color difference signals where each expanded signal occupies substantially twice the period per line of that of said wide band television signal and being derived from alternate lines in a field of said wide band television signal, and for producing second expanded luminance and color difference signals also having a line period substantially twice that of said wide band television signal and which are derived from intervening lines in said field of said wide band television signal.

9. Television transmission equipment as claimed in claim 8, characterized in that the expanded color difference signals from the alternate lines of said wideband signal and the expanded color difference signals from the intervening lines of said wide band television signal are applied to a chroma averaging arrangement for producing therefrom an averaged expanded color difference signal each line of which corresponds to the average of the color information in adjacent lines in a field of said wide band television signal prior to their application to said encoding means.

10. Television transmission equipment as claimed in claim 8 or 9, characterized in that the first and second expanded luminance signals are applied to a luminance signal averaging arrangement for averaging said expanded luminance signals, the output of said luminance averaging arrangement being applied to a high-pass filter whose output produces the high frequency narrow band television portion for said first and second luminance signals.

11. Television reception equipment for use with the television transmission equipment as claimed in claim 7, said reception equipment comprising a first input for receiving said first narrower band television signal having m lines per picture, means for deriving the low frequency luminance portion from said first narrower band television signal and means for subjecting said low frequency luminance portion to signal compression for producing a first low frequency luminance signal of n lines per picture and the same field and picture rates as said first narrower band television signal, said first low frequency luminance signal containing luminance information in alternate of its lines, characterized in that said equipment further comprises a second input for receiving said second narrower band television signal also having m lines per picture, means for deriving the low frequency luminance portion from said second narrower band television signal and means for subjecting this low frequency luminance portion to signal compression for producing a second low frequency luminance signal of the same number of lines per picture and the same field and pictures rates as said first low frequency luminance signal, said second low frequency luminance signal containing luminance information in alternate of its lines, means for deriving the high frequency luminance portion from said first and/or said second narrower band television signal and means for subjecting the high frequency luminance portion to signal compression for producing a high frequency luminance signal of the same number of lines per picture and the same field and picture rates as said first and second low frequency luminance signals, said high frequency luminance signal containing luminance information in each of its lines, means for combining said first and second low frequency luminance signals and said high frequency luminance signal in such manner as to produce a wideband luminance signal of n lines per picture containing low and high frequency information in each line, means for deriving the encoded color subcarrier from said first narrower band television signal, means for subjecting the encoded color subcarrier to signal decoding and compression for producing respective color information signals of the same number of lines per picture and the same field and picture rates as said luminance signals, said color information signals containing color information in each of their lines.

12. Television reception equipment as claimed in claim 11, characterized in that said high frequency luminance signals are derived from said second narrower band television signal, the high frequency luminance portion from said second narrower band television signal being subtracted from the high frequency portion of said first narrower band television signal to product said encoded color subcarrier.

* * * * *